United States Patent
Teixeira et al.

(10) Patent No.: US 10,597,754 B2
(45) Date of Patent: Mar. 24, 2020

(54) SYSTEM AND PROCESS FOR SELECTIVE RARE EARTH EXTRACTION WITH SULPHUR RECOVERY

(71) Applicant: VALE S.A., Rio de Janeiro (BR)

(72) Inventors: Leandro Augusto Viana Teixeira, Belo Horizonte (BR); Ruberlan Gomes Silva, Belo Horizonte (BR)

(73) Assignee: VALE S.A., Rio De Janeiro (BR)

( * ) Notice: Subject to any disclaimer, the term of this patent is extended or adjusted under 35 U.S.C. 154(b) by 220 days.

(21) Appl. No.: 14/708,131

(22) Filed: May 8, 2015

(65) Prior Publication Data

US 2015/0329940 A1 Nov. 19, 2015

Related U.S. Application Data

(60) Provisional application No. 61/993,932, filed on May 15, 2014.

(51) Int. Cl.
| | |
|---|---|
| *C22B 59/00* | (2006.01) |
| *C22B 3/08* | (2006.01) |
| *C22B 7/00* | (2006.01) |
| *C22B 1/06* | (2006.01) |

(52) U.S. Cl.
CPC ............... *C22B 59/00* (2013.01); *C22B 1/06* (2013.01); *C22B 3/08* (2013.01); *C22B 7/007* (2013.01); *Y02P 10/234* (2015.11)

(58) Field of Classification Search
None
See application file for complete search history.

(56) References Cited

U.S. PATENT DOCUMENTS

| | | | | |
|---|---|---|---|---|
| 4,973,455 A | * | 11/1990 | Tilley | C01F 15/00 423/21.1 |
| 2011/0182786 A1 | * | 7/2011 | Burba, III | C22B 3/02 423/20 |
| 2013/0336856 A1 | * | 12/2013 | Berni | C22B 59/00 423/21.1 |

FOREIGN PATENT DOCUMENTS

| | | | |
|---|---|---|---|
| CN | 1721559 A | * | 1/2006 |
| FR | 2826667 A1 | | 1/2003 |
| JP | 2001011041 A | * | 1/2001 |

OTHER PUBLICATIONS

Gupta, C.K. and N. Krishnamurthy, "Extractive Metallurgy of Rare Earths", CRC Press, pp. 59-63, 132, 133, and 142-149. 2005.
Pawlik, Christoph, "Recovery of Rare Earth Elements from Complex and Low Grade Deposits", Uranium-REE conference, ALTA 2013, Perth, Australia, (Uranium-REE Conference in Perth, Australia), May 2013.

* cited by examiner

*Primary Examiner* — Melissa S Swain
(74) *Attorney, Agent, or Firm* — Arent Fox LLP (57) ABSTRACT

The application relates to a process for rare earth extraction and thorium removal from monazite or bastnasite bearing ores or ore beneficiation and industrial waste containing a variable amount of rare earth elements as oxides, phosphates, carbonates or sulfates, comprising (i) controlled mixture between sulfuric acid and the material containing rare earth and (ii) water leaching under controlled conditions.

14 Claims, 7 Drawing Sheets

SYSTEM AND PROCESS FOR SELECTIVE RARE EARTH EXTRACTION WITH SULPHUR RECOVERY

CROSS-REFERENCE TO RELATED APPLICATION

This application claims priority to U.S. Provisional Application No. 61/993,932, filed May 15, 2014. The disclosure of the priority application is incorporated in its entirety herein by reference.

BACKGROUND OF THE INVENTION

The present invention refers to a system and process for rare earth extraction from monazite ore, bastnasite ore, ore beneficiation or industrial waste containing rare earth elements as oxide, phosphate, sulfate or carbonates.

Conventional leaching process for rare earth elements requires a large amount of acid, since some rare earth elements may be associated with iron and aluminum containing materials. Monazite and bastnasite ores and iron scrap containing rare earth elements are example of those types of materials, and its composition leads to high acid consumption, since the iron and aluminum are also responsible for acid consumption. These processes are often unfeasible.

Gupta, C. K. and Krishnamurthy, Extractive Metallurgy of Rare Earths, CRC press, disclose conventional rare earth processing options. The treatment with sulfuric acid is usually carried out in two stages, using 93% acid, temperatures between 210 and 230° C. and dissolving the rare earth sulfate by addition of water. With this method, depending on the acid/ore ratio, temperature and concentration, either thorium or rare earths may be selectively solubilized or both thorium and rare earths totally solubilized. Since the reaction is strongly exothermic, there is a limit to the addition of acid, but below 200° C. the reaction proceeds very slow. In the caustic process, after the reaction is processed, the mixture is cooled to 70° C. and diluted about ten times in cold water. Rare earths and thorium salts stay in solution while the insoluble portion quickly precipitates due to the high density. The phosphate content of the ore is recovered as a marketable by-product, trisodium phosphate, at the beginning of the flowchart, and this has been a major attraction for the commercial use of this process. In the usual industrial practice, fine ground monazite is attacked with 60-70% sodium hydroxide solution at 140-150° C. In the Soviet practice, the grinding and caustic digestion are performed in one step and this enables about 50% savings in caustic soda consumption. Krumholz (1957) achieved a clean separation by digesting the ore with caustic soda at 170° C. under a pressure of several atmospheres. The mixed rare earth thorium hydroxide cake is processed for rare earths and thorium recovery by a variety of methods. Document U.S. Ser. No. 13/887,027, in the name of Vale S. A, discloses a system and method for rare earth extraction wherein rare earth from iron containing minerals can be selectively extracted. However, this process requires a long residence time in the furnace, and usually does not provide satisfactory results for high silica containing ore.

Christoph Pawlik, Recovery of Rare Earth Elements from Complex and Low Grade Deposits, Uranium-REE conference, May 2013, ALTA 2013, Perth, Australia, (Uranium-REE Conference in Perth, Australia) discloses a review on the rare earth process, especially for low grade rare earth ore. Pawlik mentions the mineralogy dependence and several options for processing routes, proposing the conversion of rare earth in sulfates wherein the ore is mixed with concentrate sulfuric acid at temperatures between 150 and 250° C. However, this process requires a large amount of acid, due to the most of iron and aluminum are reacted into sulfates.

Patent FR2826667, cited as prior to U.S. patent Ser. No. 13/887,027 discloses a first stage leaching with sulfuric acid is added to the ore, followed by calcination steps/burning (roasting) conducted at elevated temperature. Precipitation steps/extraction/isolation were also described in this document. This invention has several drawbacks, as a high acid consumption and the need of very high temperatures. The mechanism involved comprises the conversion all species in the ore into sulfates (including the impurities) and decomposing them at high temperatures into insoluble oxides, releasing SOx. This invention takes care of reducing the amount of impurities added but still needs a high amount of sulfuric acid to be added and high temperatures to decompose some of the formed sulfates. Unlike the present invention which has a lower acid consumption, lower temperature and furnace time.

Further the above-mentioned documents fail on presenting the process condition, selective pyrolysis and reactions mechanism for better result control.

The present invention provides a system and process aiming to reduce the furnace residence time, increase the performance on high silica containing ore, allowing the recovery of sulfur during pyrolysis stage and decreasing the sulfuric acid consumption. The controlled mixture stage allows rare earth conversion at low temperature, which is relevant for high silica containing ore, therefore increasing rare earth extraction and decreasing furnace time. $SO_3$ is released during selective pyrolysis stage, increasing the conversion of iron and aluminum oxide in sulfates, enhancing the encounter probability between ion/aluminum sulfates and rare earth compound, increasing rare earth sulfate conversion and extraction. The pyrolysis products are easily leached, since most of them are oxides.

SUMMARY OF THE INVENTION

The present invention refers to a process for rare earth extraction (lanthanum, cerium, praseodymium, neodymium, promethium, samarium, europium, gadolinium, terbium, dysprosium, holmium, erbium, thulium, ytterbium, lutetium, yttrium and scandium) from monazite or bastnasite bearing ores or ore beneficiation and industrial waste containing a variable amount of rare earth elements as oxides, phosphates, carbonates or sulfates and iron or aluminum.

The process of the present invention comprises the following stages: (i) ore beneficiation, (ii) gas sulfation for sulfur recovery, (iii) controlled mixture, (iv) selective pyrolysis and (v) water leaching for rare earth sulfate dissolution. In the present invention, the control of the reaction mechanism is the core of the process, reflected in the controlled mixture stage and pyrolysis stage.

In one aspect of the present invention, the sulfur recovery stage may be optional.

In other aspect, as an optional stage, SO3 gas may be used in a sulfation stage, gas-solid reaction to be process prior to the controlled mixing stage. This stage partially converts part of ore components in sulfates, decreasing the overall acid consumption. SO3 gas may also be recovered by using a sulfuric acid plant, if available on site.

BRIEF DESCRIPTION OF THE DRAWINGS

The present invention will now be described in more details with reference to the attached drawings, wherein.

DETAILED DESCRIPTION OF THE INVENTION

The present invention refers to a process for rare earth extraction from monazite ore, bastnasite ore, ore beneficiation and industrial waste containing rare earth elements.

In one aspect, the present invention refers to the effectiveness on the removing and separation of thorium from rare earth elements, wherein the process route consumes low amount of sulfuric acid, allowing the application for low grade ore and wastes.

In another aspect, the present invention provides improvements on the process disclosed in U.S. Ser. No. 13/887,027. The rare earth elements may be presented as phosphates, oxides or sulfates.

The initial stage of the present invention encompasses the physical beneficiation steps, aiming rare earth content upgrade. After particle size reduction stage for rare earth element release, there is another stage of physical beneficiation so as to allow material upgrade, particularly relevant for low grade ore or waste, since it decreases the processing cost per ton of processed material. The rare earth content upgrade may be achieved by particle size classification (e.g., sieve or cyclone classification), gravity classification or flotation. This is an optional stage, and depends on the nature and composition of the material.

The material is then transferred to the mixer and sulfuric acid is added. This stage is important for the final performance of the overall process, in particular for waste or ore containing high amount of silica. The rare earth conversion into sulfates starts in this stage.

Figure 1:
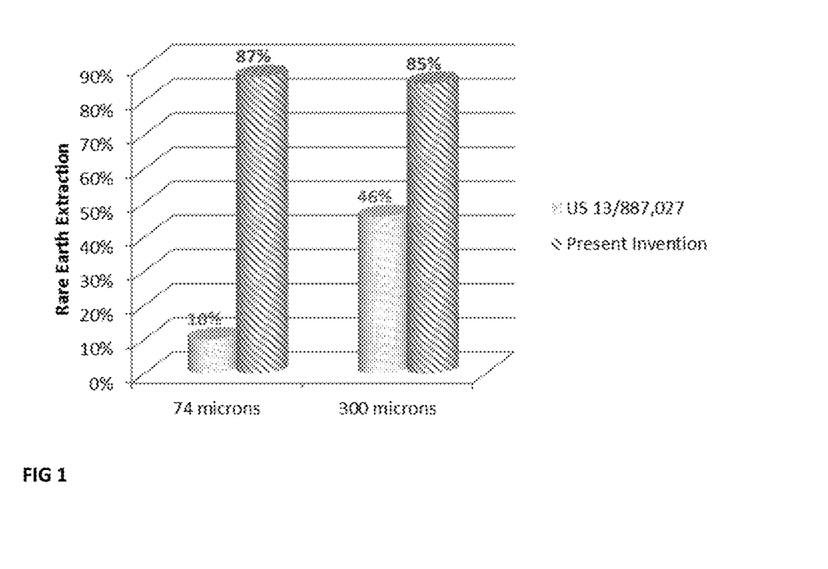
FIG. 1 shows the increase in rare earth extraction by employing the controlled mixture stage for a rich silica ore of the present invention, when compared to publication U.S. Ser. No. 13/887,027.
Figure 2:
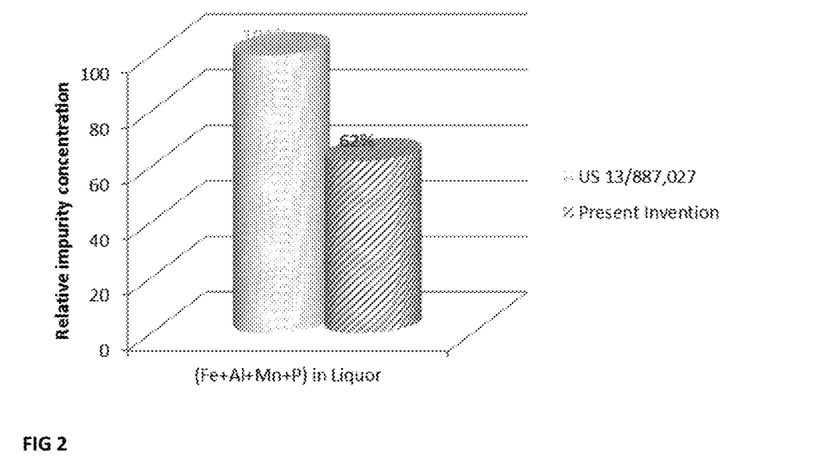
FIG. 2 shows the decrease of impurities in the leached liquor, when the selective pyrolysis is applied, according to the present invention.

FIG. 1 shows the difference in efficiency obtained when the process described in U.S. Ser. No. 13/887,027 is applied compared to the present invention, in which controlled mixture stage was employed. The present invention also produces liquor with lower impurity concentration, obtained by leaching of the material after pyrolysis in the furnace, as can be seen in FIG. 2.

Figure 3:
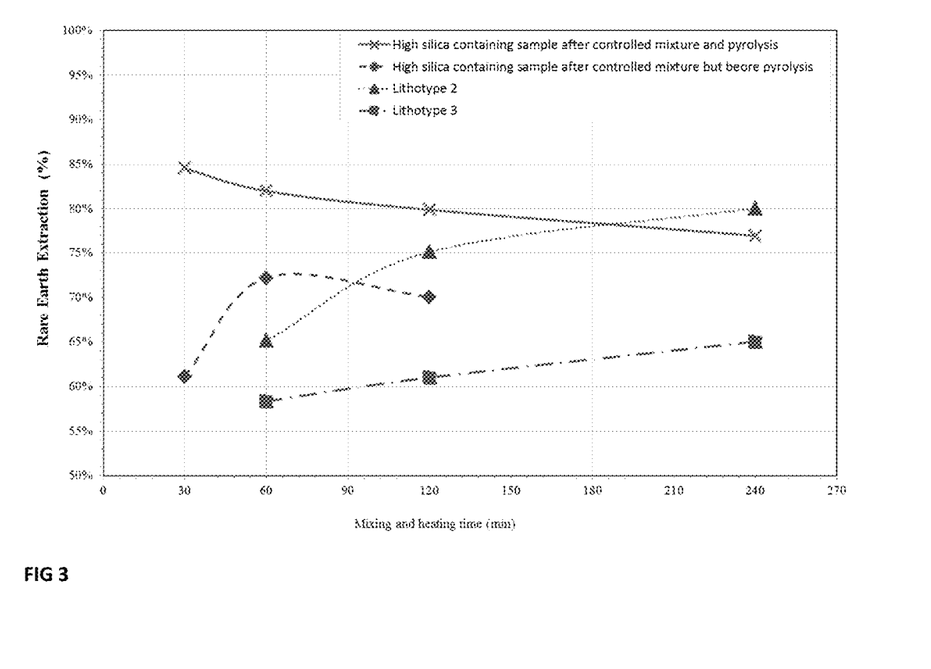
FIG. 3 shows the increase in rare earth extraction during controlled mixture as a function of mixture time according to the present invention.
Figure 4:
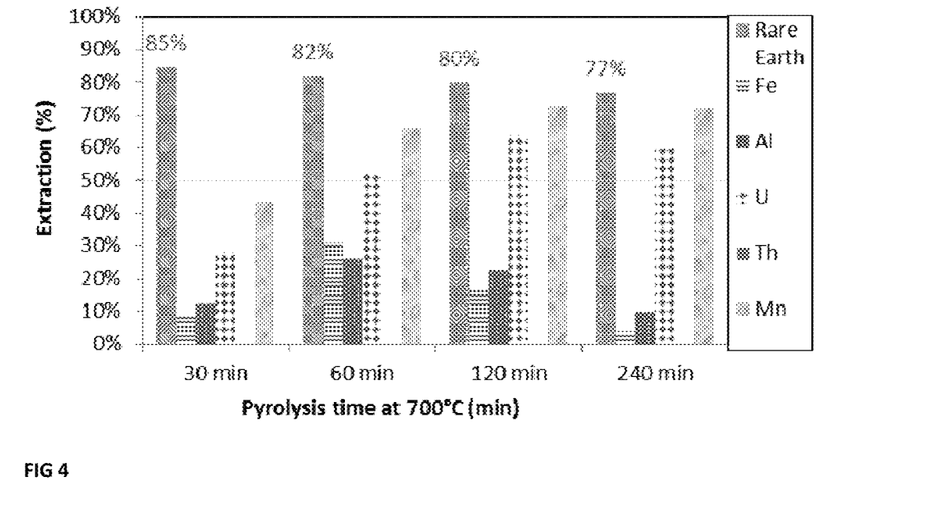
FIG. 4 shows the reduction in pyrolysis time due to the controlled mixture stage for silica rich materials according to the present invention.
Figure 11:
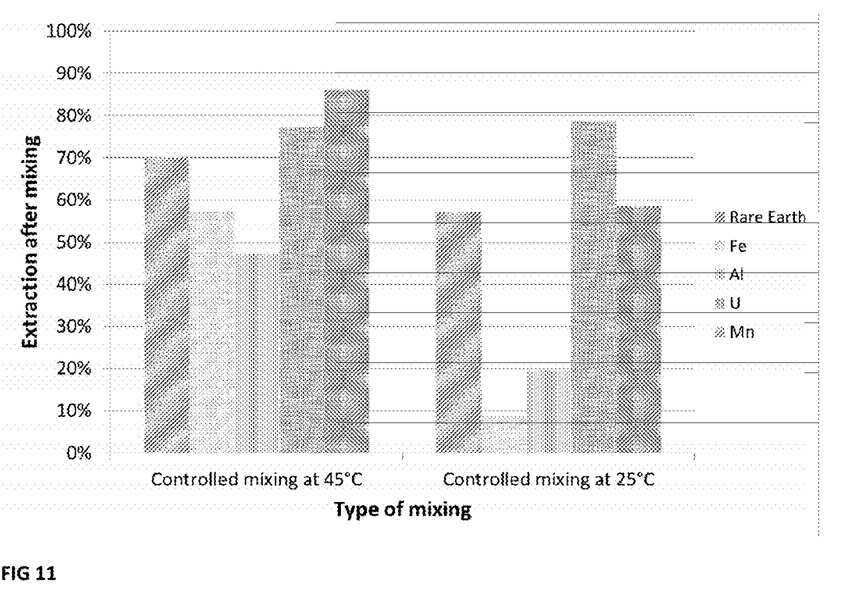
FIG. 11 shows the increase in rare earth extraction with increase of controlled mixing temperature, according to the present invention.

More than 50% rare earth elements are converted into sulfates in the controlled mixture stage, making it possible to have a processing route containing only the controlled mixture stage and the aqueous leaching stage. FIG. 3 shows the rare earth extraction value as a function of mixing time. More vigorous mixing provides better results. The mixing time may range from 5 to 240 minutes, preferable between 5 and 45 minutes. Table 1 shows the reactions which may occur during this stage and during heating. The reactions kinetics may be enhanced by temperature, as can be seen in FIG. 11. A sufficient amount of sulfuric acid is added in order to react with rare earth elements and the primary consumers of acid, such as alkaline and alkaline earth metals. Those elements irreversibly react, and the consumed sulfur cannot be recovered. Most of iron and aluminum is not responsible for acid consumption. In some cases, more than 80% rare earth extraction may be reached by just applying the controlled mixture and water leaching stages. The controlled mixing stage allows the necessary contact between the sulfuric acid (added in small amount) and the target material, as well as the contact between the sulfates of iron and aluminum and the rare earth compound, solid-solid reaction showed in Table 1. The controlled mixture stage may be carried out in various types of equipment, for example, but not limited to, a pug-mill or an intensive mixture.

TABLE 1

| | High probability | Low probability |
|---|---|---|
| Reactions that may occur at temperatures between room temperature and 80° C. (controlled mixture stage) | | |
| $2REEPO_4 + 3H_2SO_4 \rightarrow REE_2(SO_4)_3 + 2H_3PO_4$ | X | — |
| $Fe_2O_3 + 3H_2SO_4 \rightarrow Fe_2(SO_4)_3 + 3H_2O$ | X | — |
| $Al_2O_3 + 3H_2SO_4 \rightarrow Al_2(SO_4)_3 + 3H_2O$ | X | — |
| $Ca_3(PO_4)_2 + 3H_2SO_4 \rightarrow 3CaSO_4 + 2H_3PO_4$ | X | — |
| $MgO + H_2SO_4 \rightarrow MgSO_4 + H_2O$ | X | — |
| $MnO + H_2SO_4 \rightarrow MnSO_4 + H_2O$ | X | — |
| $ThO_2 + 2H_2SO_4 \rightarrow Th(SO_4)_2 + 2H_2O$ | X | — |
| $U_3O_{8(s)} + 4H_2SO_{4(l)} \rightarrow 2UO_2SO_{4(s)} + U(SO_4)_2 + 4H_2O_{(l)}$ | X | — |
| $CaO + H_2SO_4 \rightarrow CaSO_4 + H_2O$ | X | — |
| $K_2O + H_2SO_4 \rightarrow K_2SO_4 + H_2O$ | X | — |
| $2REEPO_4 + Fe_2(SO_4)_3 \rightarrow REE_2(SO_4)_3 + 2FePO_4$ | — | X |

TABLE 1-continued

|  | High probability | Low probability |
|---|---|---|
| $2REEPO_4 + Al_2(SO_4)_3 \rightarrow REE_2(SO_4)_3 + 2AlPO_4$ | — | X |
| $2H_3PO_4 + Fe_2(SO_4)_3 \rightarrow 2FePO_4 + 3H_2SO_4$ | — | X |
| $2H_3PO_4 + Al_2(SO_4)_3 \rightarrow 2AlPO_4 + 3H_2SO_4$ | — | X |
| Reactions that may occur at temperatures between 80° C. and 720° C. (pyrolysis stage) | | |
| $REE_2(SO_4)_3 \rightarrow REE_2O_3 + 3SO_3$ | — | X |
| $Fe_2(SO_4)_3 \rightarrow Fe_2O_3 + 3SO_3$ | X | — |
| $Al_2(SO_4)_3 \rightarrow Al_2O_3 + 3SO_3$ | — | X |
| $Th(SO_4)_2 \rightarrow ThO_2 + 2SO_3$ | X | — |
| $2REEPO_4 + Fe_2(SO_4)_3 \rightarrow REE_2(SO_4)_3 + 2FePO_4$ | X | — |
| $2REEPO_4 + Al_2(SO_4)_3 \rightarrow REE_2(SO_4)_3 + 2AlPO_4$ | X | — |
| $CaF_2 + H_2SO_4 \rightarrow CaSO_4 + 2HF$ | X | — |
| $SiO_2 + 4HF \rightarrow SiF_4 + 2H_2O$ | X | — |
| $H_2SO_4 \rightarrow H_2O + SO_3$ | — | X |
| Reactions that may occur at temperatures above 720° C. (pyrolysis stage) | | |
| $REE_2(SO_4)_3 \rightarrow REE_2O_3 + 3SO_3$ | X | — |
| $Fe_2(SO_4)_3 \rightarrow Fe_2O_3 + 3\ SO_3$ | — | X |
| $Al_2(SO_4)_3 \rightarrow Al_2O_3 + 3SO_3$ | X | — |
| $Th(SO_4)_2 \rightarrow ThO_2 + 2SO_3$ | — | X |
| $MgSO_4 \rightarrow MgO + SO_3$ | | |
| $3U(SO_4)_{2(s)} + O_2 \rightarrow U_3O_{8(s)} + 6SO_{3(g)}$ | X | — |
| $MnSO_4 \rightarrow MnO + SO_3$ | X | — |

The next stage is the pyrolysis stage, in which a suitable furnace is employed. The temperature at this stage should be between 650° C. and 750° C., preferably between 680° C. and 720° C. The main purpose of pyrolysis stage is the decomposition of sulfates of deleterious elements such as iron, aluminum and thorium sulfates.

Figure 5:
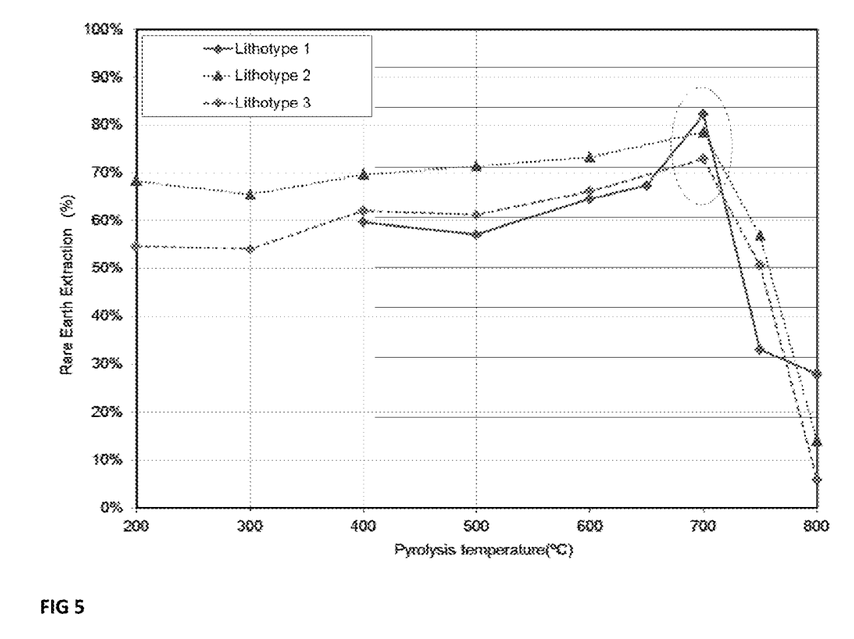
FIG. 5 shows the effect of pyrolysis temperature on rare earth sulfate decomposition according to the present invention.
Figure 6:
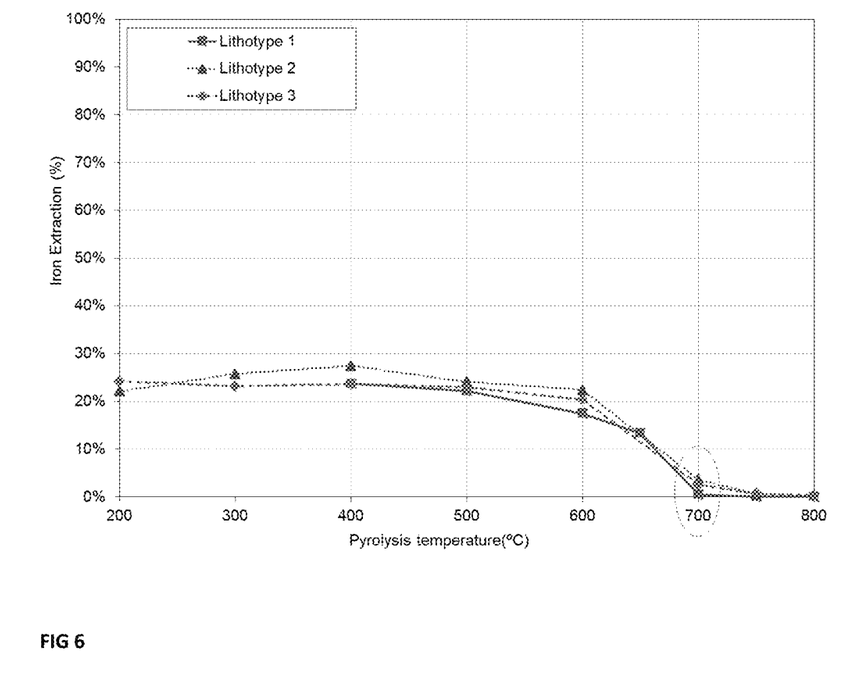
FIG. 6 shows the effect of pyrolysis temperature on ferric sulfate decomposition according to the present invention.
Figure 10:
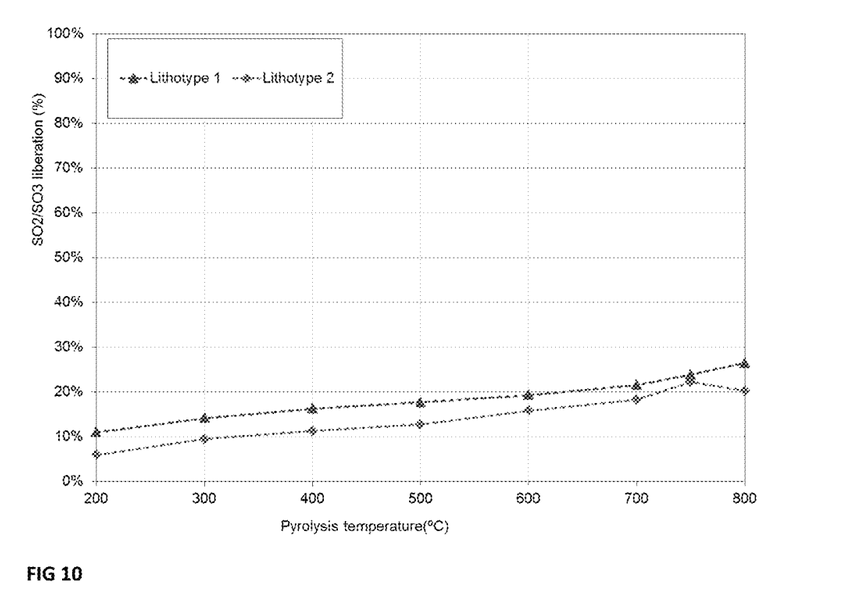
FIG. 10 shows $SO_x$ gas generation during the heating of the sample, according to the present invention. Results were estimated by mass balance.

In pyrolysis stage, the solid-solid reactions between sulfates and phosphates are enhanced due to an increase in kinetics. In temperatures higher than 335° C., non-reacted sulfuric acid decomposes, generating SO3 gas. SO3 gas flows through the furnace, reacting with oxides and generating more sulfates that will react with phosphates, increasing extraction efficiency. More SO3 gas is generated through the decomposition of deleterious sulfates, such as iron, aluminum and thorium, at temperatures close to 650° C., as illustrated in FIG. 10. FIG. 5 shows the temperature limit for rare earth sulfate decomposition. FIG. 6 shows the decomposition of iron sulfate (and subsequent SO3 gas release). The temperature gap between the rare earth sulfate and iron sulfate decomposition is the main factor for the process selectivity.

Figure 7:
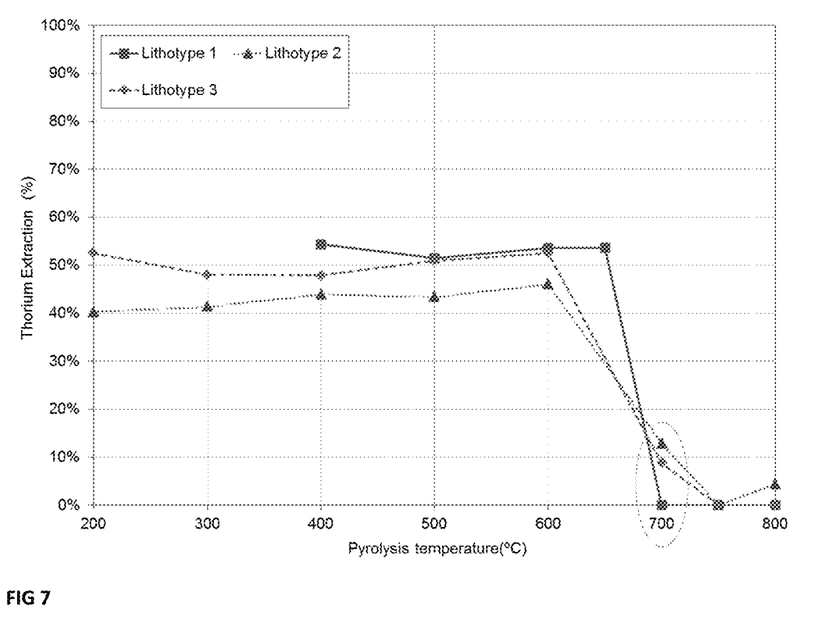
FIG. 7 shows the effect of pyrolysis temperature on thorium sulfate decomposition according to the present invention.

FIG. 7 shows the decomposition of thorium sulfate, which leads to a reduced thorium solubility during the leaching stage.

The $SO_3$ released during the pyrolysis stage may be captured and re-used in the process. This recovery may lead to a significant decrease in sulfuric acid consumption, making the process route more economically attractive. The $SO_3$ may be captured from the furnace out gas, and may be sent to the sulfuric acid plant for conversion to sulfuric acid. It may also be used to be contacted with feeding material before the controlled mixture stage. The $SO_3$ reacts with oxides, such as Ca, Mg and rare earth, generating sulfates and reducing the acid consumption in the subsequent stage. If enough water is present, phosphate conversion in phosphate may also take place, leading to the conversion of rare earth present as phosphate into sulfate. The water may be added to the $SO_3$ containing gaseous stream or may be directly added to the feeding material. Another possible source of water is from water containing compound decomposition, present in the feeding material. An example of such case is the water released by goethite present in some ores.

Figure 12:
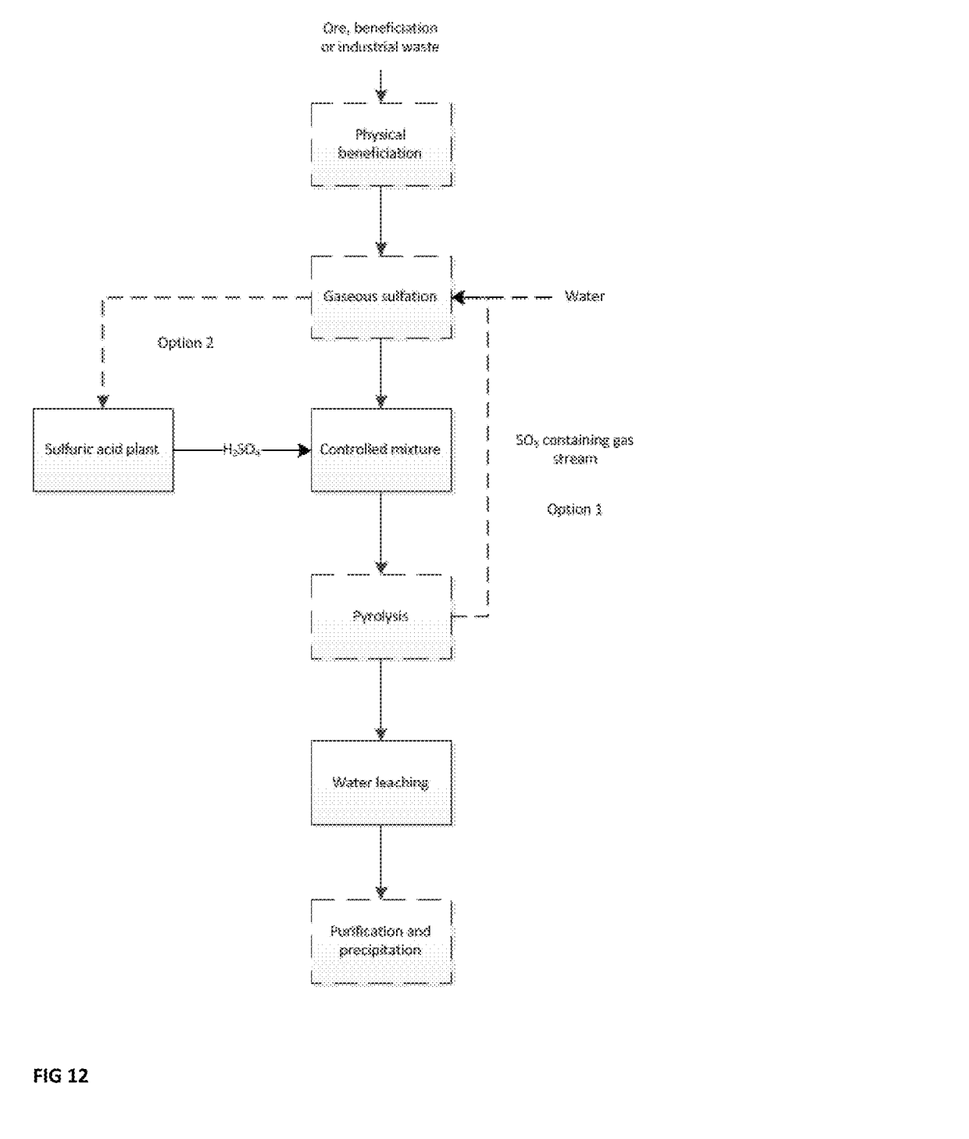
FIG. 12 shows the flowchart according to the present invention, including all optional stages, denoted by the dashed lines. In option 1 SO3 gas is recovered by solid-gas sulfation prior to the controlled mixture stage; and in option 2 SO3 gas is recovered through conversion in H2SO4 liquid in a sulfuric acid plant.

Those possibilities for $SO_3$ recovery and re-use are shown in FIG. 12, together with the overall process flowchart.

Figure 8:
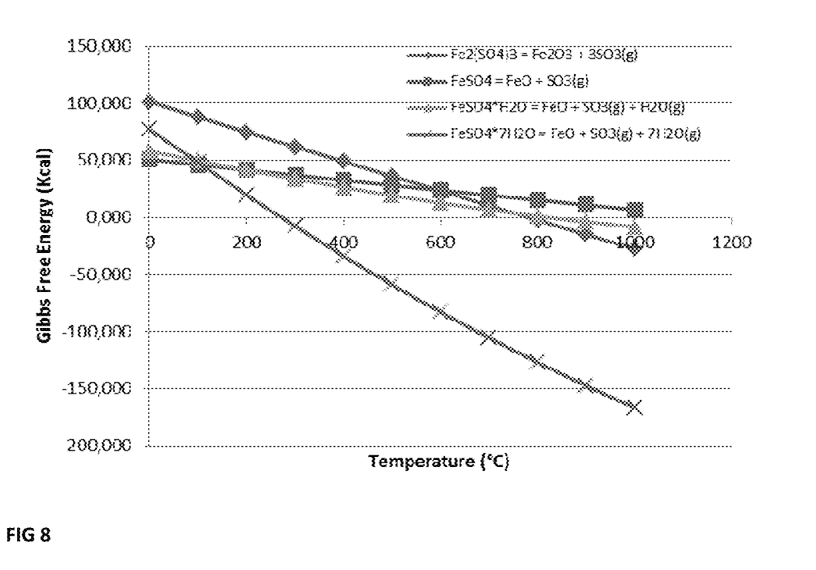
FIG. 8 shows a thermodynamic chart for iron sulfate decomposition, as anhydrous ferric sulfate, ferrous sulfate and hydrated variations, according to the present invention.
Figure 9:
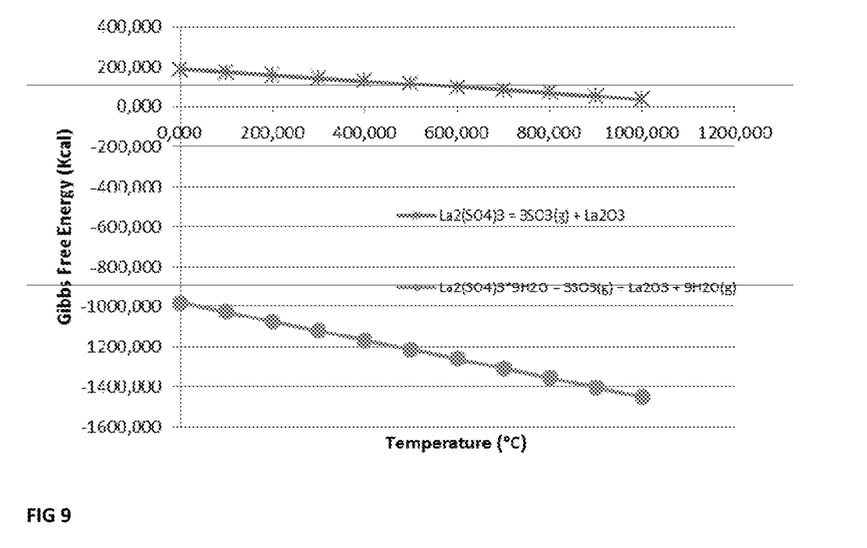
FIG. 9 shows a thermodynamic chart for anhydrous and hydrated rare earth sulfates. Calculated by software.

The selective sulfates decomposition is dependent on the hydration form of the formed sulfate, therefore depending on the hydration form of the initial material. FIG. 8 shows thermodynamic calculations for the decomposition temperature as a function of the amount of hydration degree presented in iron sulfate compounds. If the decomposition window of the hydrated compounds is overlapped, a heating pre-treatment may be required. The same phenomenon occurs for rare earth sulfates. The theoretical decomposition temperature is the temperature when the Gibbs free energy is zero.

The reacted material goes into a water leaching stage, with a controlled pH between 1.5 and 2.0. The process may take place at temperatures below 50° C., preferable at room temperature. The pulp concentration may range from 5-40%, preferable between 10-20%.

The other downstream stages, such as purification and precipitation of rare earth elements are known for those skilled in the art. One possibility is the pH controlling the impurity removal and rare earth precipitation as oxalate, chlorides, double sulfates or hydroxides.

EXAMPLES

The following examples are intended to illustrate the present invention, and these are to be construed in a non-limitative manner. It is clear that various modifications in the process of the invention and in the choice of reactants might be resorted to by one skilled in the art without departing from the scope of the present invention.

Example 1: Rich Rare Earth Ores Used in the Tests Might be Classified in Poor and Rich silica ore. Poor silica ore was beneficiated in order to separate the particles smaller than 74 µm, rich in rare earth elements. The beneficiation for this ore involves the screening in ¼ in, grinding the coarser to ¼ in minimum, mixing with fines passing in the screening ¼ in, scrubbing the mixture for 30 minutes and classifying in hydrocyclones with 74 µm cut-size. The fraction below 74 µm was dried and employed in the rare earth extraction tests. Rare earth contents in the fraction below 74 µm increased 1.68 times for Lithotype 1, 1.88 for Lithotype 2 and 1.67 for Lithotype 3. Rich silica content was grinding below 300 µm, dried and used to carry out the tests.

Example 2

225.98 g beneficiated ore or Lithotype 1, dried and with particles 100% below 74.mu.m, was analyzed and mixed with 47.78 g sulphuric acid (98% w/w). The relation of sulphuric acid/beneficiated ore was of 211 kg/t. The acid was added to the sample, with mixing speed between 100-200 rpm for 15 min. The sulfated ore was kept in a mufle at 700° C. for 4 hours. Cured and sulphated ore was cooled down up to room temperature. The material was leached and filtered under vacuum condition to obtain a "rich rare earth sulphuric liquor". The results are showed in Table 2.

TABLE 2

Tests results of rare earth extraction with Lithotype 1

|  | Beneficiated ore (<74 µm) (Solid) | Dry cake (Solid) |
|---|---|---|
| Mass (g) | 225.98 | 196.65 |
| Chemical Analyses (% w/w for solids and mg/L for liquids) | | |
| REO (rare earth oxides) | 4.26 | 0.88 |
| $Fe_2O_3$ | 36.87 | 42.20 |
| $Al_2O_3$ | 5.59 | 5.74 |
| $SiO_2$ | 19.00 | 21.82 |
| $P_2O_5$ | 4.00 | 4.38 |
| $MnO_2$ | 1.00 | 0.56 |
| CaO | 0.63 | 0.50 |
| MgO | 0.45 | 0.31 |

Extractions (% w/w)

| REO | $Fe_2O_3$ | $Al_2O_3$ | $SiO_2$ | $P_2O_5$ | $MnO_2$ | CaO | MgO |
|---|---|---|---|---|---|---|---|
| 82.10 | 0.39 | 10.61 | 0.05 | 4.72 | 51.46 | 31.15 | 40.30 |

It was extracted 82.10% feed REO and only 0.39% feed Fe2O3, the main deleterious in the beneficiated ore with a low sulphuric acid per ton of beneficiated ore (211 kg/t). The sulphate balance indicated that 60% total sulphate in mixture ore plus concentrated sulphuric acid was lost during the pyrolysis in mufle as SO3 gases. These gases could be used to react the feed ore before the reaction with sulphuric acid.

Example 3

200.38 g beneficiated ore or Lithotype 2, dried and with 100% particles below 74 µm size, was analyzed and mixed with 68.13 g sulphuric acid (98% w/w). The relation of sulphuric acid/beneficiated ore was 340 kg/t. It was employed the same procedure above-described in Example 2. The results are showed in table 3.

TABLE 3

Tests results of rare earth extraction with Lithotype 2

|  | Beneficiated ore (<74 µm) (Solid) | Dry cake (Solid) |
|---|---|---|
| Mass (g) | 200.38 | 157.64 |
| Chemical Analyses (% w/w solids and mg/L liquids) | | |
| REO (rare earth oxides) | 4.70 | 1.43 |
| $Fe_2O_3$ | 31.18 | 38.30 |
| $Al_2O_3$ | 5.97 | 6.43 |
| $SiO_2$ | 19.48 | 24.70 |
| $P_2O_5$ | 7.46 | 8.96 |
| $MnO_2$ | 1.24 | 0.61 |
| CaO | 5.38 | 5.29 |
| MgO | 4.82 | 1.69 |

Extractions (% w/w)

| REO | $Fe_2O_3$ | $Al_2O_3$ | $SiO_2$ | $P_2O_5$ | $MnO_2$ | CaO | MgO |
|---|---|---|---|---|---|---|---|
| 76.10 | 3.36 | 15.31 | 0.21 | 5.53 | 61.51 | 22.68 | 72.42 |

It was observed a high extraction of magnesium oxide content. Minerals with magnesium in composition easily react with sulphuric acid. It was extracted 76.10% feed REO and only 3.36% feed Fe2O3, the main deleterious in the beneficiated ore with a medium sulphuric acid per ton of beneficiated ore (340 kg/t). Sulphate balance indicated that 19% total sulphate in mixture ore plus concentrated sulphuric acid was lost during the pyrolysis in mufle as SO3 gases. These gases could be used to react the feed ore before the reaction with sulphuric acid.

Example 4

203.68 g beneficiated ore or Lithotype 3, dried and with 100% particles below 74 µm size, was analyzed and mixed with 50.74 g sulphuric acid (98% w/w). The relation of sulphuric acid/beneficiated ore was 250 kg/t. It was employed the same procedure above-described in Example 2. The results are presented in Table 4.

TABLE 4

Tests results of rare earth extraction with Lithotype 3

|  | Beneficiated ore (<74 µm) (Solid) | Dry cake (Solid) |
|---|---|---|
| Mass (g) | 203.68 | 155.56 |
| Chemical Analyses (% w/w for solids and mg/L for liquids) | | |
| REO (rare earth oxides) | 4.86 | 1.64 |
| $Fe_2O_3$ | 34.39 | 44.00 |
| $Al_2O_3$ | 5.28 | 5.30 |
| $SiO_2$ | 17.43 | 22.80 |
| $P_2O_5$ | 6.24 | 6.92 |
| $MnO_2$ | 1.22 | 0.70 |
| CaO | 2.22 | 1.83 |
| MgO | 1.59 | 0.73 |

Extractions (% w/w)

| REO | $Fe_2O_3$ | $Al_2O_3$ | $SiO_2$ | $P_2O_5$ | $MnO_2$ | CaO | MgO |
|---|---|---|---|---|---|---|---|
| 74.23 | 2.26 | 23.32 | 0.13 | 15.34 | 56.38 | 37.32 | 65.22 |

It was extracted 74.23% feed REO and only 2.26% feed Fe2O3, the main deleterious in the beneficiated ore with a low sulphuric acid per ton of beneficiated ore (250 kg/t).

Sulphate balance indicated that 18% total sulphate in mixture ore pies concentrated sulphuric acid was lost during the pyrolysis in mufle as SO3 gases. These gases could be used to react of the feed ore before the reaction with sulphuric acid.

Example 5—Recovery and Re-Use of $SO_3(g)$ Released During Pyrolysis Stage

Ore containing 4.7% rare earth (as oxides) was contacted with a stream of $SO_3(g)$ generated from the decomposition of sulfuric acid 104%. The ore sample was kept at 50° C. The initial ore composition is showed in table 5.

TABLE 5

Initial ore composition

| S (%) | Al2O3 (%) | TiO2 (%) | CaO (%) | Fe2O3 (%) | MgO (%) | P2O5 (%) | Si (%) | ThO2 (ppm) | Rare earth (as oxides) (%) |
|---|---|---|---|---|---|---|---|---|---|
| 0.013 | 5.,86 | 11.42 | 4.95 | 30.14 | 4.50 | 6.65 | 8.51 | 198.16 | 4.7 |

The $SO_3$ was generated through the heating of smoking sulfuric acid, as showed in table 6.

TABLE 6

SO3 generation conditions

| Time (min) | Temperature (° C.) |
|---|---|
| 10 | 109.1 |
| 20 | 136.7 |
| 30 | 152 |
| 40 | 169 |
| 50 | 170 |
| 60 | 175.3 |
| 70 | 184.5 |
| 80 | 189.6 |
| 90 | 206.1 |
| 100 | 221.6 |

After contact with gas, the ore was leached in water under controlled conditions. The ore had its natural humidity. Table 7 shows the reached extraction levels.

TABLE 7

Extraction results after ore contact with SO3 gas stream.

| Rare Earth extraction | 40% |
|---|---|
| Fe extraction | 17% |
| Al extraction | 23% |
| Si extraction | 1% |
| Th extraction | 39% |
| U extraction | 43% |
| P extraction | 27% |
| Mn extraction | 36% |
| Mg extraction | 15% |
| K extraction | 12% |
| Ba extraction | 0% |
| Ti extraction | 3% |
| Ca extraction | 38% |

Example 6

137.01 g rich silica ore, dried and with 100% particles with size below 300.mu.m, was analyzed and mixed with 27.41 g sulphuric acid (98% w/w). The relation of sulphuric acid/beneficiated ore was 200 kg/t. Sulphuric acid was slowly added on the ore while stirring at 100 rpm. Then, the rotation speed was increased to over 300 rpm for 5 minutes and after reduced to 200 rpm and kept stirring for 240 minutes. Sulfated ore was kept in a mufle at 700° C. for 30 minutes. Cured and sulphated ore was cooled down to room temperature. It was leached and the pulp was filtered under vacuum condition to obtain a rich rare earth sulphuric liquor and washed wet cake. Both streams were weighted. The rich rare earth liquor was analyzed and the results are showed in Table 8.

TABLE 8

Tests results of rare earth extraction with rich silica ore (100% <300 μm, reaction with sulphuric acid + Pyrolysis in Mufle)

| | Beneficiated ore (<300 μm) (Solid) | Dry cake (Solid) |
|---|---|---|
| Mass (g) | 137.01 | 120.15 |
| Chemical Analyzes (% w/w solids and mg/L liquids) | | |
| REO (rare earth oxides) | 4.97 | 0.83 |
| $Fe_2O_3$ | 7.54 | 8.05 |
| $Al_2O_3$ | 0.24 | 0.25 |
| $SiO_2$ | 71.50 | 79.00 |
| $P_2O_5$ | 3.59 | 4.03 |
| $MnO_2$ | 0.75 | 0.56 |
| CaO | 1.76 | 1.57 |
| MgO | 0.025 | 0.001 |

Extractions (% w/w)

| REO | $Fe_2O_3$ | $Al_2O_3$ | $SiO_2$ | $P_2O_5$ | $MnO_2$ | CaO | MgO |
|---|---|---|---|---|---|---|---|
| 85.34 | 6.25 | 8.88 | 0.02 | 1.54 | 35.35 | 22.19 | 97.18 |

According to table 8, it was extracted 85.34% feed REO and only 6.25% feed $Fe_2O_3$, the main soluble deleterious. It was consumed a low amount of sulphuric acid per ton of beneficiated ore (200 kg/t).

What is claimed is:

1. A process for rare earth extraction from monazite or bastnasite bearing ores or ore beneficiation or industrial waste comprising an amount of rare earth elements as oxides, phosphates, carbonates or sulfates, the method consisting of (i) controlled mixing between sulfuric acid and the monazite or the bastnasite bearing ores or the ore beneficiation or the industrial waste; and (ii) water leaching under controlled conditions,
    wherein the controlled mixing is performed from 5 to 240 minutes at a temperature above room temperature to 80° C., and a speed of 100-300 rpm.
2. The process according to claim 1, wherein the controlled mixing is performed from 5 to 45 minutes.
3. The process according to claim 1, wherein the controlled mixing is performed at a temperature of 45° C.

4. The process according to claim 1, wherein the water leaching is performed at a temperature between 15° C. and 70° C.

5. The process according to claim 4, wherein the water leaching is performed at a temperature between 20° C. and 50° C.

6. The process according to claim 1, wherein the water leaching pH is controlled between 1.5 and 4.0.

7. The process according to claim 6, wherein the water leaching pH is controlled between 1.5 and 2.0.

8. A process for rare earth extraction from monazite or bastnasite bearing ores or ore beneficiation or industrial waste comprising an amount of rare earth elements as oxides, phosphates, carbonates or sulfates, the method consisting of (i) controlled mixing between sulfuric acid and the monazite or the bastnasite bearing ores or the ore beneficiation or the industrial waste; and (ii) water leaching under controlled conditions, wherein the controlled mixing is performed from 5 to 240 minutes at a temperature above room temperature to 80° C.

9. The process according to claim 8, wherein the controlled mixing is performed from 5 to 45 minutes.

10. The process according to claim 8, wherein the controlled mixing is performed at a temperature of 45° C.

11. The process according to claim 8, wherein the water leaching is performed at a temperature between 15° C. and 70° C.

12. The process according to claim 11, wherein the water leaching is performed at a temperature between 20° C. and 50° C.

13. The process according to claim 8, wherein the water leaching pH is controlled between 1.5 and 4.0.

14. The process according to claim 13, wherein the water leaching pH is controlled between 1.5 and 2.0.

* * * * *